United States Patent [19]

Kerr et al.

[11] Patent Number: 4,652,761
[45] Date of Patent: Mar. 24, 1987

[54] GRATING OZONE SPECTROPHOTOMETER

[76] Inventors: James B. Kerr; Charles T. McElroy; David I. Wardle, all of 4905 Dufferin Street, Downsview, Ontario, Canada, M3H 5T4

[21] Appl. No.: 677,950

[22] Filed: Dec. 4, 1984

[51] Int. Cl.$^4$ ............................. G01J 3/18; G01J 3/32
[52] U.S. Cl. .................................... 250/372; 250/373; 356/328; 356/332
[58] Field of Search ................ 250/373, 372; 356/328, 356/326, 329, 308, 309, 310, 320, 332, 334, 330, 300, 331

[56] References Cited

U.S. PATENT DOCUMENTS 3,229,566  1/1966  Hutchinson et al. ............... 356/329
4,448,529  5/1984  Krause ............................... 356/310

FOREIGN PATENT DOCUMENTS 2080947  2/1982  United Kingdom ............... 356/331

Primary Examiner—Carolyn E. Fields

[57] ABSTRACT

A holographic grating spectrophotometer for detecting ozone and sulphur dioxide in the atmosphere is described which provides automatic calibration and which provides automatic linearity correction for the photomultiplier tube. Automatic calibration is provided by using a computer to control a stepper motor to move the grating so that the photomultiplier tube receives maximum intensity at the calibration wavelength of 302.1 nm from a mercury source. Automatic linearity correction is obtained by cycling a wavelength selection mask across exit slits located in the focal plane of the device and firstly combines separately taken counts of two different wavelengths and comparing this sum with the sum of counts of these wavelengths taken simultaneously. The difference is used to calculate photomultiplier tube deadtime and improve accuracy of the results. In a preferred embodiment five wavelengths are used to calculate ozone and sulphur dioxide levels, and a stepper motor driving a cylindrical wavelength selection mask permits exit slits to be exposed to predetermined wavelengths one at a time.

14 Claims, 10 Drawing Figures

GRATING OZONE SPECTROPHOTOMETER

The present invention relates to diffraction grating ozone measuring spectrophotometers and particularly, but not exclusively, to diffraction grating ozone spectrophotometers for use in measuring ozone and sulphur dioxide levels in the atmosphere.

Knowledge of ozone and sulphur dioxide levels in the atmosphere is very desirable because these levels are believed to be related to a variety of environmental conditions. For example, the level of sulphur dioxide is thought to be closely related to the amount of acid rain and the amount of ozone is related to the amount of UV radiation which passes throughly the atmosphere and reaches the surface of the earth. Also, it is believed that the ozone level will be reduced by a substantial amount if chlorofluoromethanes (CFM's) continue to be released into the atmosphere at the present rate. Knowledge of the levels of these gases is also believed to be of assistance in detecting and predicting future climatic changes using atmospheric models and for determining the effect of changes in pollutant levels on the climate.

Measurements of specific gases such as ozone and sulphur dioxide may be obtained through use of a spectrophotometer which measures the light intensity at different wavelengths which are selected accordingly to absorption characteristics of the desired gases. Sulphur dioxide and ozone have strong absorption characteristics in the ultraviolet region of the solar spectrum and these wavelengths are used both to measure ozone and sulphur dioxide by the solar absorption method.

An ozone spectrophotometer should, in addition to being simple to use and reliable have a number of desirable features. It should have a response to the measured constituents which is linear in the amount of those constituents over the range of values encountered in the atmosphere and it should be very stable in its characteristics and precise in its measurements so that trends in the measurements of atmospheric constituents may be accurately determined. It should operate automatically and require minimal supervision by an operator. It should also require minimal calibration and its calibration should remain constant throughout a prolonged period so as to ensure accuracy and consistency between results. The data it provides should be readily processible by automated digital techniques to facilitate interpretation of the results.

Although several different types of measuring instruments exist, the most common instrument which has been used to measure ozone and sulphur dioxide levels is known as the Dobson spectrophotometer. This instrument has been in use for about fifty years, although it has been considerably developed from its original design. The Dobson instrument uses a double crystal quartz monochrometer, with two slits, and the ratio of two intensities is measured by introducing an optical wedge in front of the brightest (long wavelength) slit to equalize the two intensities. Equalization is determined by chopping between the two beams which then pass to a photomultiplier. The signal from the photomultiplier is AC amplified and passed through a phase sensitive detector. The position of the optical wedge is adjusted until a null is found and the ratio of the two intensities is read off from the position of the wedge. This intensity measurement method has the implicit problem of calibrating the wedge and it is found that the calibration can change with time. In addition, because the system measures the relative intensities of the two wave lengths, it is inherently impossible to measure more than two wavelengths at a time. The use of the Dobson spectrometer or similar instruments has been limited to measurements made on direct sun or clear skies when the sun is high in the sky ie. when a large amount of ozone is in the incident path.

It has been found that a considerable increase in accuracy was obtained with the Dobson spectrometer when measurements were made upon two wavelength pairs. The observed values of log $I(\lambda)/I(\lambda_2)$ for the two pairs is subtracted and use is made of the large non-linearity of the ozone absorption coefficient as a function of wavelength. The influence of all other absorbers is much reduced when these absorbers have an absorbtion spectrum which has a small curvature with respect to wavelength. With the Dobson spectrophotometer, the two wavelength pairs must be observed at different times, and changes in the sky between observations ie. temporal changes in the radiation field measured causes inaccuracies in the double pair measurement procedure. Other reports have indicated that a very great improvement can be achieved if three or four wavelengths, equivalent to a three pairs observed as nearly simultaneously as possible.

A substantial improvement over the Dobson ozone spectrometer was reported by Brewer in the Journal of Pure and Applied Geophysics, Volume 106–108 (1973) which disclosed a spectrophotometer which was a modified Ebert spectrograph. This device made use of taking measurements at four wavelengths and forming three pairs of wavelengths to increase accuracy. Using this technique, it was reported, the ozone amount was measured with a standard error of less than 1%. This device diffracted incident light using a diffraction grating and a spherical mirror to image a spectrum onto a set of four exit slits. The mirror then reflected the diffracted light through four slits located in the focal plane of the spectrophotometer, each slit corresponding to the location of one of four particular wavelengths of the spectrum. The intensity of each wavelength was measured by opening each slit in quick succession by moving small electrically operated paddles which otherwise cover each slit and photometery was achieved by counting photons during the period in which each slit is fully open. The counts from the four are gated to an appropriate one of four scalers. The ratio of the intensities is obtained from the ratio of the counts after the dark counts have been subtracted, or allowance made for any non-linearity of the counters. With this device a fifth slit is provided to correspond to a wavelength of 312.67 nanometers (nm), at which wavelengths there is a mercury line emission which is present in ordinary fluorescent lights and which may be used to calibrate the spectrophotometer. This fifth slit was opened manually by moving a simple sliding shutter and the wavelength setting can be checked very easily. Because this slit is much narrower than the usual working slits, the setting accuracy was enhanced.

However the paddles proved to be unreliable because of their ability to move deteriorated with time, and frequent adjustments were necessary because of the delicate nature of the paddles. Also the Dobson ozone measurements could be interfered with by the optical effects sulphur dioxide polution. In addition there was no automatic calibration with this device which meant calibration had to be done manually and because this took up to an hour it was not done frequently. Because the calibration was prone to change from time to time results were inaccurate because of the difficulty in charaterising the "dead time" parameter of the photon counting system required for data analysis. If the dead time parameter was not calculated properly, the results were unreliable because closely spaced pulses could not be properly discriminated resulting in counting errors which were exhibited as counting non-linearities.

An object of the present invention is to obviate or mitigate the aforesaid disadvantages.

The present invention provides a spectrophotometer which provides automatic calibration and which provides automatic linearity correction of measured signals.

In one aspect of the present invention there is provided a spectrophotometer comprising:

a housing having mirror means for reflecting an incident light input, diffraction grating means for receiving the reflected light input and for diffracting the reflected light to give a light spectrum, a plurality of exit slit means located in the focal plane of the spectrophotometer, each exit slit means corresponding to a particular wavelength of the light spectrum, photomultiplier tube means for receiving focussed light from said exit slit means and converting said focussed light into electrical signals, control means for controlling the orientation of the diffraction grating means in the housing, calibration means having a light source for providing a calibration spectrum, said calibration spectrum being gated to said photomultiplier tube by an additional slit located in the focal plane of the spectrophotometer, said control means orienting said diffraction gating means for scanning said calibration spectrum and determining the median wavelength position of said calibration spectrum.

said control means constituting means effective to provide a control signal in response to the median wavelength position for adjusting the position of the diffraction grating to provide said particular wavelengths at each of said respective slits.

According to a second aspect of the present invention there is provided a spectrophotometer having means for automatically linearising the output signal of a photomultiplier tube comprising:

a housing having mirror means for collimating incident light input, diffraction grating means for diffracting the collimated light to give a light spectrum, a plurality of exit slit means located in the focal plane of the spectrophotometer, each exit slit means correspondng to a particular wavelength of the light spectrum, said photomultiplier tube receiving focussed light from said exit slit means and converting said focussed light into electrical signals, wavelength cycling means located in the housing, said wavelength cycling means having a mask for covering said exit slits with a plurality of apertures therein, corresponding to respective exit slits, said mask being movable to bring a respective aperture into register with a respective exit slit to allow light at that particular wavelength to pass to the photomultiplier tube, said mask having at least two additional apertures for permitting light from two particular wavelengths to pass to said photomultiplier tube at the same time, and control and computing means for calculating the sum of the light intensity from two wavelengths at different times, and comparing said sum with the value of light intensity obtained in response to light from two particular wavelengths being passed to said photomultiplier tube at the same time, said control means constituting means effective to use said comparison to automatically linearise said photomultiplier tube output.

According to a further aspect of the present invention there is provided a method of determining the ozone and sulphur dioxide gas concentration in the atmosphere, the method comprising:

observing the atmosphere and receiving incident light therefrom, diffracting said incident light to produce a diffracted signal having a frequency spectrum with wavelengths a function of the said gases in the atmosphere, passing said wavelengths through selected slits in said spectrophotometer focal plane to provide light of particular wavelengths, detecting the intensity of said particular wavelengths using a photomultiplier tube and generating corresponding electrical signals therefrom, providing an additional slit and a calibration light source for causing light to pass through said additional slit, scanning said light which passes through said calibration slit and producing a signal representative of the median wavelength intensity of said calibration light, controlling the location of said diffraction grating using said median wavelength signal to adjust said grating to maximise the correlation of said median wavelength signal to provide wavelengths of a predetermined value at said respective slits.

According to a further aspect of the present invention there is provided a method of automatically linearising a spectrophotometer output signal comprising the steps of:

recording the light intensity of a first wavelength at a first time, recording the light intensity at a second wavelength at a second time, adding the light intensities recorded at said first and second wavelengths to give a first summed intensity value, recording the light intensities from both first and second wavelengths at the same time to give a second summed intensity value, comparing the sum of said first and second summed values, processing the difference between said first and second summed values to provide an indication of deadtime, and using said indication of deadtime to compensate for non-linearity in the spectrophotometer output signal.

According to yet another aspect of the present invention there is provided apparatus for controllng the wavelength to be read from a spectrophotometer by a photomultiplier tube comprising:

a generally cylindrical mask having a plurality of apertures therein, said apertures being spaced around the periphery of said mask in parallel planes perpendicular to the cylindrical axis, means for rotating said mask about said cylindrical axis to bring a predetermined aperture in the mask into register with a respective slit in said focal plane to permit light of a particular wavelength to pass from said spectrophotometer to said photomultiplier tube.

In a preferred embodiment of the invention, there are six exit slits in the focal plane. One exit slit is used for wavelength calibration against a mercury line reference at 302.1 nm and the other five are operational wavelengths which pass light at 306.3 nm (nanometers), 310.0 nm, 313.5 nm, 316.8 nm and 320.0 nm with a resolution of 0.6 nm.

Immediately adjacent to the exit slit plane is a cylindrical movable wavelength selection mask with a plurality of apertures which allows light to fall on only one exit slit at a time. The mask is moved by a stepping motor so that when an aperture coincides with a respective exit slit, light passes into the cathode of the photomultiplier tube for about 0.13 seconds. Each measurement cycle consists of two observations at each of five wavelengths plus two dark count measurements, and lasts about 1.6 seconds. During the time the mask is stepped from one wavelength position to the next, the signal from the photomultiplier is electronically gated to eliminate mechanical transition effects.

Light passing through the exit slits falls on the photomultiplier tube cathode, and every photon of light detected at the cathode produces a pulse of about 16 nanoseconds duration. The pulses are amplified, shaped and counted and photon counts from one of five wavelengths are routed to one of five count registers. The photon count in each of the five registers is proportional to the intensity of light passing through the corresponding exit slit.

A computer inside the spectrophotometer coordinates the movement of the wavelength selector mask and photon counts. The computer also controls a stepping motor which drives a micrometer which rotates the diffraction grating and adjusts the detected wavelengths, as well as other operations such as the insertion and removal of a ground quartz diffusing plate; the selection of neutral density filters, the activation of an iris to adjust the field of view, the zenith angle of the entrance prism, and the azimuth pointing of the instrument relative to the plane of the sun.

The computer handles all communications between the spectrophotometer and external devices such as a computer or data terminal. A Commodore PET is used to control the computer and can be used in a semi-automatic or fully automatic mode. In the semi-automatic mode, the operator selects a specific observation or test, and the PET sets up the measurement procedure and carries out the test. The operator determines the observation schedule and instrument configuration such as setting filters and printing. In the fully automated mode the computer controls all operations, and the observation configuration is obtained using stepper motors. Data for both semi-automated and fully automated modes can be stored on disk or tape and analysed or printed out on a hard copy record.

These and other aspects of the present invention will become apparent from the following description with reference to the accompanying drawings in which.

Figure 9:
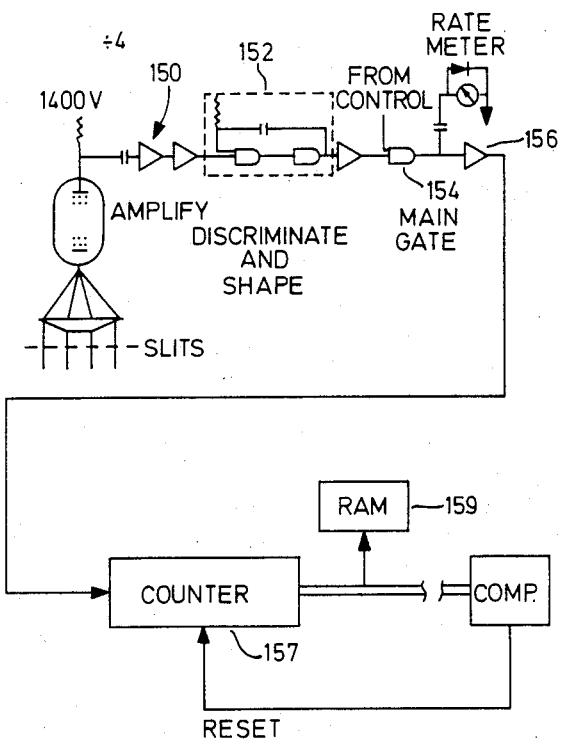
Figure 10:
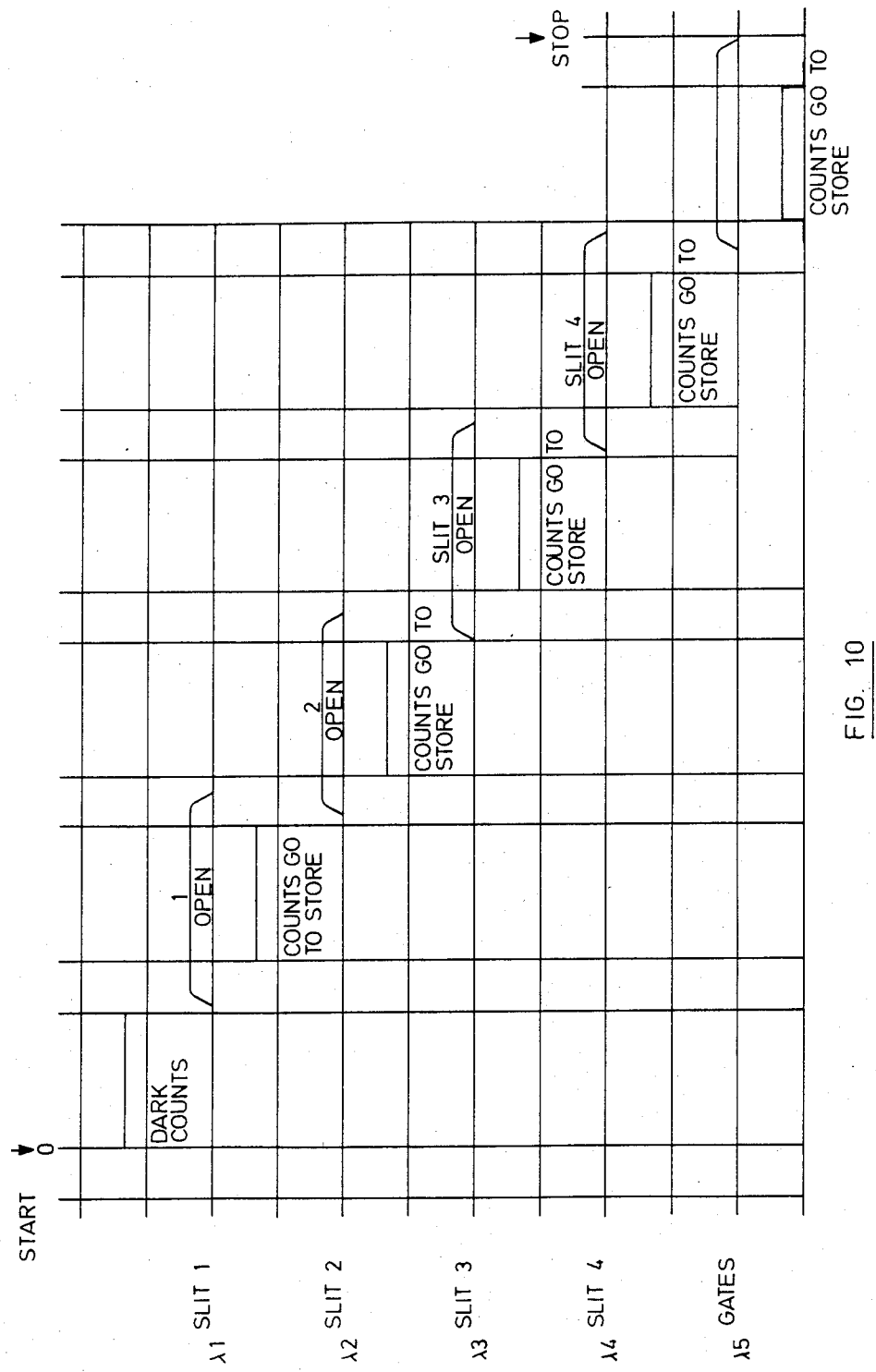

FIG. 9 illustrates the signal processing system for generating electrical signal and subsequent counts from the intensity of the particular wavelengths read by the photomultiplier tube, and FIG. 10 is a graph of the control cycle for the photomutiplier receiving different wavelengths at different slits and showing how the photomultiplier is gated to count only during the period when particular slits are exposed to a particular wavelength by the mask.

Figure 1:
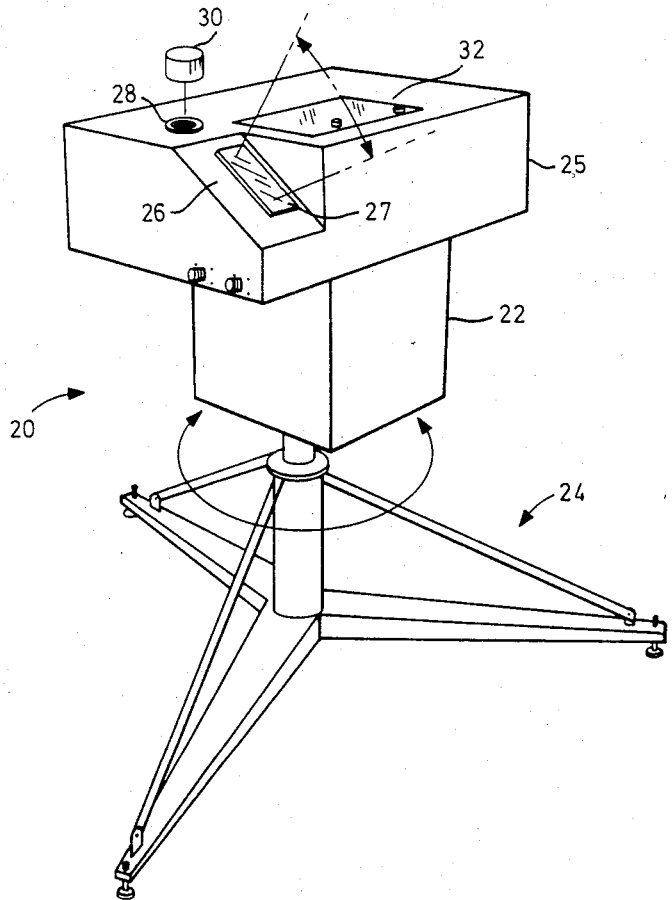
FIG. 1 is a diagrammatic view of a spectrophotometer according to a preferred embodiment of the invention.

Referring to FIG. 1 of the drawings, the spectrophotometer, generally indicated by reference numeral 20, comprises a top unit 22 rotatably mounted on a tripod stand 24 so that the path of the sun can be followed. The top unit 22 has a housing 25 which covers a chassis 29, as will be later explained, on which are mounted the spectrophotometer optics. The housing has a cut-away sloped portion 26 in which a viewing window 27 is provided to a viewing prism, a diffuser window 28 and cover 30, and a panel 32 to permit access to the spectrophotometer optic controls.

Figure 2:
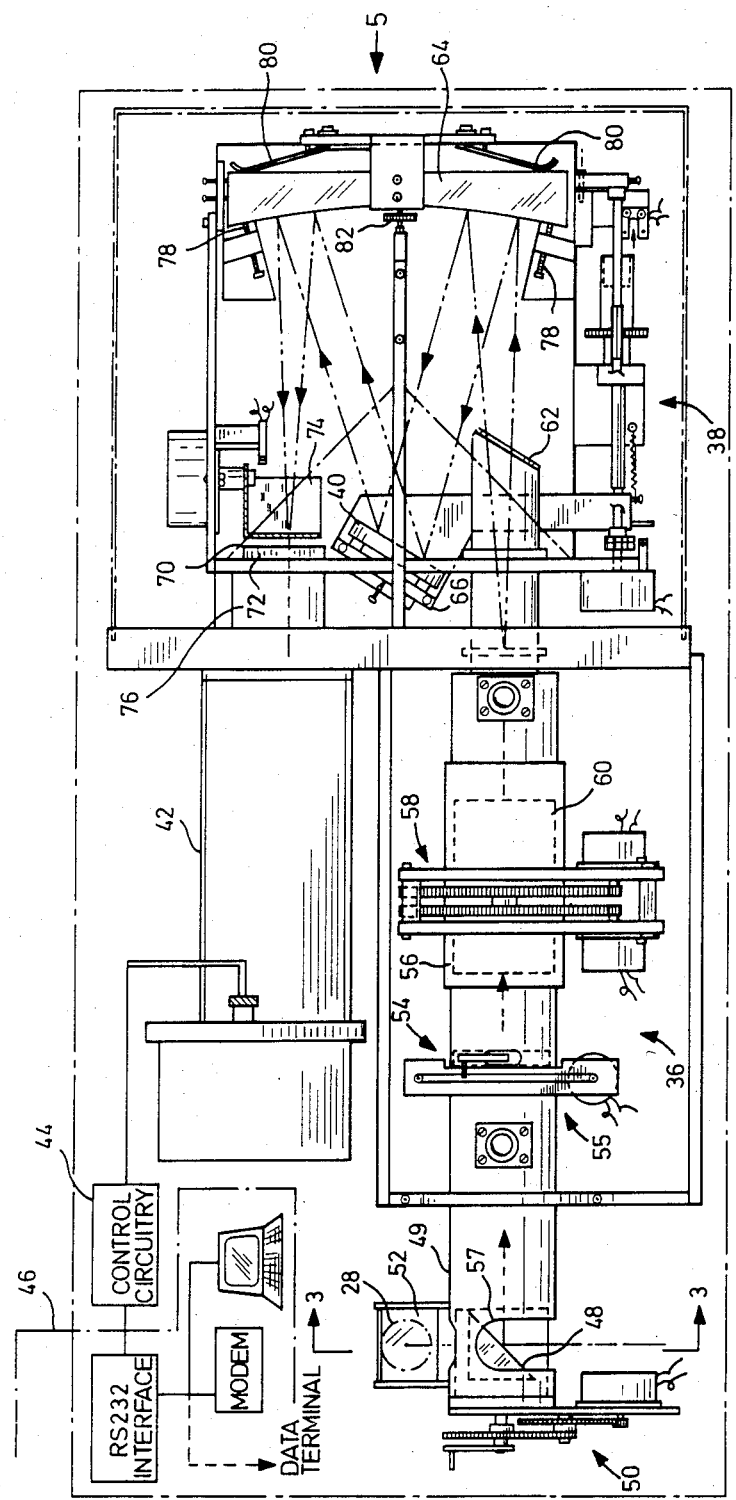
FIG. 2 is a diagrammatic plan view of the apparatus of FIG. 1 with the cover removed and including diagrammatic details of the signal processing connector.

Referring now to FIG. 2 of the drawings, the spectrophotometer optics consist of a foreoptic section 36 for gathering light from the atmosphere and passing it to the spectrophotometer chamber, generally indicated by reference numeral 38, which includes a circular diffraction grating 40 for dispersing the incident light to produce a spectrum therefrom. The light path through the spectrophotometer is shown in broken lines. Selected wavelengths of the spectrum are passed out of the spectrophotometer chamber to a photomultiplier tube 42 which measures the intensity of each wavelength as will be explained. The photon counts are processed in internal control circuitry, generally indicated by reference numeral 44, for subsequent manipulation and interpretation by external signal processing circuitry, generally indicated by reference numeral 46.

Figure 3:
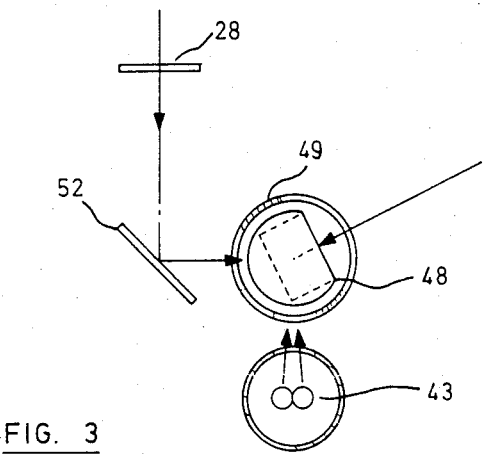
FIG. 3 (on the same sheet as FIG. 1) is a sectional view taken along the line 3—3 in FIG. 2 and showing the optics used for calibrating the equipment.

In particular, the foreoptic section 36 includes a prism 48 mounted in a stationary sleeve 49. The prism is rotatable by a geared motor drive 50 to direct the prism to receive light from zenith sky, direct sun or a calibration lamp 53, as shown in FIG. 3. The diffuser window 28 is used to view the overall sky effect. The light passes through an iris 54, a lens set 56, a filter disc 58 and a second lens set 60 to a tilted lens 62 located just behind the entrance slit to the spectrophotometer chamber 38. This lens corrects astigmatism and residual coma while the slight asymmetery of the instrument leaves uncorrected (a perfectly symmetrical instrument would exhibit no coma, and this instrument would be symmetrical with the grating 40 replaced by a plane mirror, so that the incident and reflected beams were of the same width). The tilted lens 62 reduces optical aberrations so that an overall spectral purity of about 0.05 nm is achieved at the focal plane. The incident beam for the tilted lens is collimated by reflection from the surface of a 32 cm radius spherical mirror 64, to the diffraction grating 40. As will be explained later the diffraction grating 40 fits in a grating frame 66 and is mounted thereto by cross wires (not shown in the interest of clarity). The grating can be automatically rotated under the control of the control circuitry and a micrometerbased grating adjustment mechanism, generally indicated by reference numeral 63 adjusts the wavelength produced by the grating to a precision of 0.2 nm as will be explained.

A 50 nm diameter 1800 line/nm holographic grating of the second order is used ($\lambda = 320$ nm) and longer wavelength light is removed by a 2 mm cobalt glass filter (UG 11) (not shown). A 10 mm NiSO$_4$ crystal filter (not shown) is also used to reduce light at wavelengths between 330 nanometers and 360 nanometers. Light from these wavelengths interferes mainly because of grating ghosts and the grating currently used ghosts at wavelengths about $\pm 25$ nanometers from the parent wavelength with an intensity of about $10^{-3}$ that of the parent. Thus light is reduced to about $10^{-2}$ by ozone at 310 nanometers at a $\mu$ value (the relative path through the ozone due to the obliquity of the sun's rays) of about 4, a ghost from light of 335 nanometers with very little ozone attenuation accounts for about 10% of the measured signal. The NiSO$_4$ is necessary to remove the undesired light from the ghosts at longer the wavelengths.

Because of the non-linear temperature dependence of the NiSO$_4$ with wavelengths, the operational wavelengths are set at $\lambda_1 = 306.3$ nanometers, $\lambda_2 = 310.0$ nanometers, $\lambda_3 = 313.5$ nanometers, $\lambda_4 = 316.8$ nanometers and $\lambda_5 = 320.0$ nanometers with a resolution of about 0.6 nm. The close spacing of these wavelengths reduces wavelength dependent effects originating from clouds and haze.

The diffracted light from the diffraction grating 40 is dispersed into a spectrum which is again reflected from the spherical mirror 64 and focussed onto an exit plane 70 which has six spaced slits 72 for coinciding with particular wavelengths of the spectrum. The slits are located in the focal plane at the desired wavelengths with the slit widths equivalent to 0.6 nanometers. Five of the slits are successively exposed to respective wavelengths by using a rotatable cyclindrical mask 74 (and the sixth slit is used for calibration) as will be later described. Light passing through the selected slits 72 is focused onto the cathode (not shown) of the photomultiplier tube 42 by using a Fabry lens 76. This optical arrangement is used to prevent problems of spatial variation in the spectral sensitivity of the photocathode. As will be explained, there is a counter associated with each exit slit which accumulates photon counts occurring during the interval that slit is exposed.

The exposure of each slit is synchronised by the control circuitry 44 to the opening of an electronic gate which routes the photons to the appropriate counter. A suitable time period is allowed to ensure that all mechanical motion is complete before the accumulated counts is begun for a particular wavelength.

The output signals from the photomultiplier tube are processed in control circuitry 44, which contains an RCA CPD 18S60/Cosmac Microboard computer. This is programmed to accept and execute external commands and return the results of the commands to the user. The exit slit mask motor, the wavelength calibration micrometer motor and the on/off switching to the calibration lamps are functions controlled by the computer. A standard communication link is provided by a RS232 interface to a modem for transmission to a data terminal, e.g. teleprinter, or to a commercially available microcomputer such as a Commodore PET or an Apple 2, from which the data can be recorded on magnetic tape or disc, and real time ozone or sulphur dioxide results can be printed to a hard copy or to a remote terminal over a telephone/modem communications link.

Referring still to FIG. 2 of the drawing, parts of which have been removed to better illustrate the grating, and also it will be seen that the spherical mirror 64 is cut to a rectangular form of 5 cm$\times$16.5 cm and rests on nylon tip screws 78, two of which are shown, which are located on solid bases attached to the chassis. The mirror is spring loaded against the screws by spring 80. A locating screw 82 is located in the centre of the mirror at its top edge. In this way the position the position of the centre of curvature is determined so that after a disturbance the mirror resets itself accurately.

Figure 4:
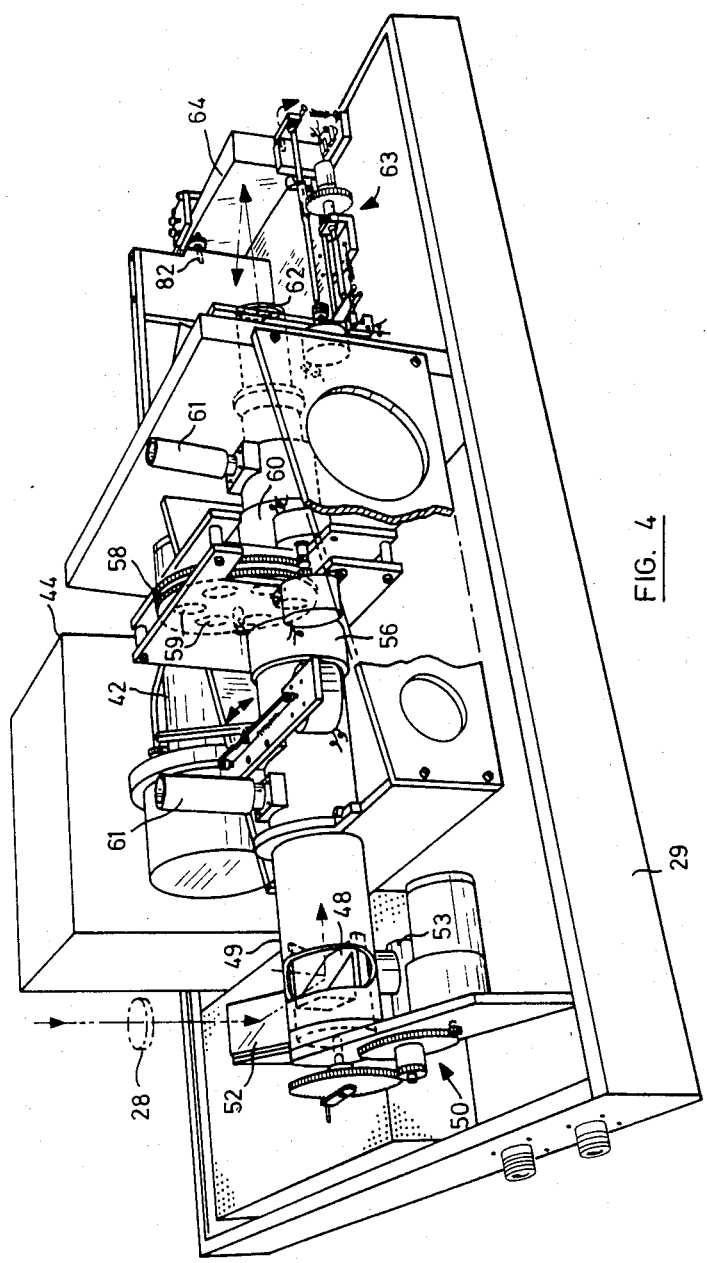
FIG. 4 is a perspective and partly broken away enlarged view of the spectrophotometer chassis of FIG. 1 with the housing covers removed.

Referring to FIG. 4 of the drawings, the size and relationship of the physical components of the spectrophotometer optics is shown. All of the components are mounted on the chassis 29. The prism 48 is shown mounted in the cylindrical telescope housing 49 and can receive light from the diffuser inlet 28 via mirror or through window 27 and slot 57 (see FIG. 2). The iris 54 has a motor and pulley drive, generally indicated by reference numeral 55 for varying the aperture. This is controlled by control circuitry 44. The light passes through housing 49 through lens sets 56 and 60 and through geared filter 58. The filter has six holes 59 which align with the centre of the telescope housing. Filters can be selectively located in these holes to give many different filter combinations. The telescope also has viewing windows 61. The light enters chamber 38 via tilted lens 62 as previously explained.

Figure 5:
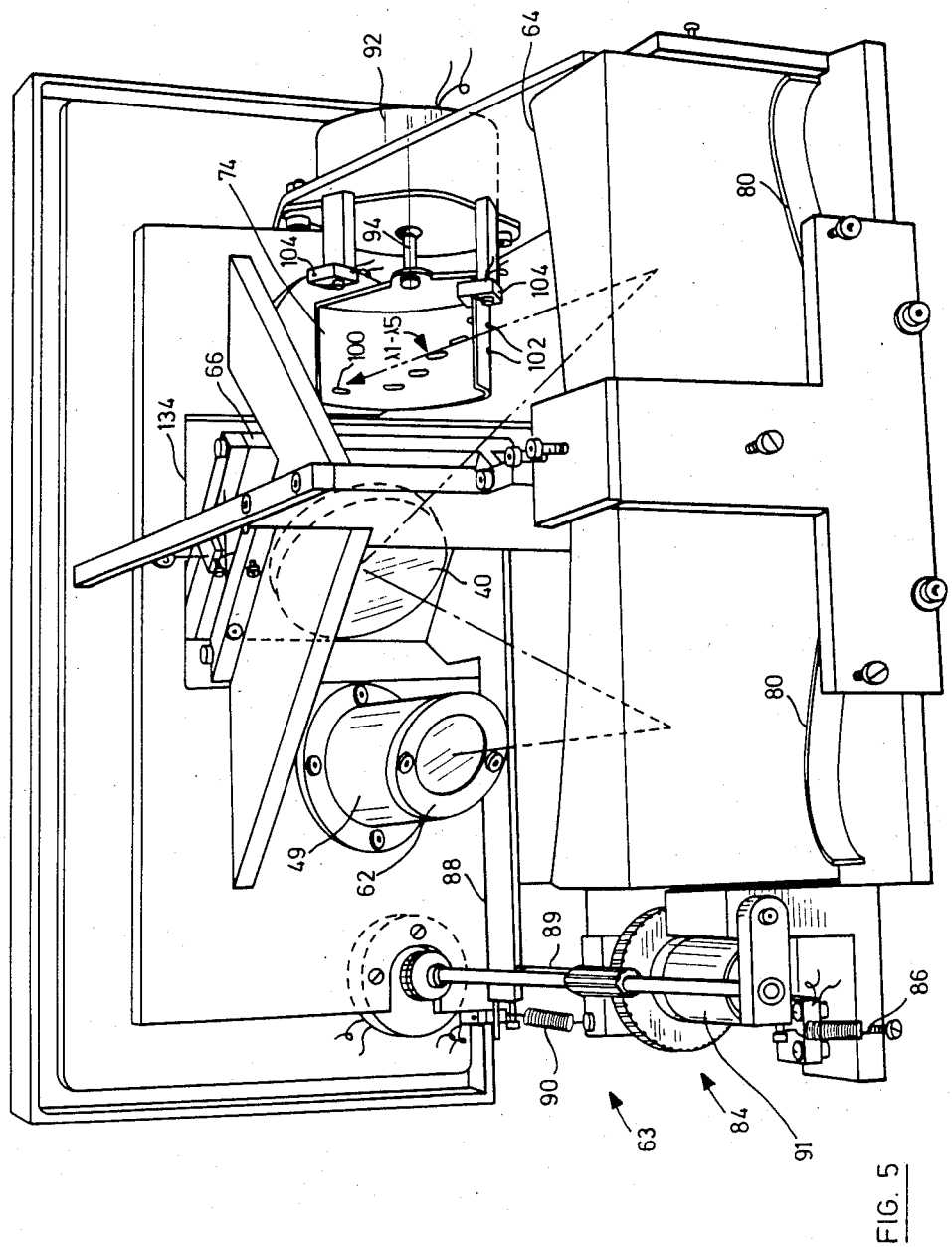
FIG. 5 is a view of part of the spectrophotometer of FIG. 5 taken in the direction of arrow "2"

Referring now to FIG. 5, the diffractor grating adjustment mechanism 63, as will be explained, includes mesh gears 84 which are spring loaded by springs 86 which prevent backlash and ensure accuracy of positioning the grating, which is achieved using control lever 88 which is moved by a push rod 89 in response to the gears 84 driven by stepper motor 92. The control lever 88 is also loaded by a spring 90 to damp out movement. The light reflected onto the grating 40 is dispersed to form a light spectrum back onto the mirror 64 where it is again reflected to the photomultiplier tube 42 via semi-cylindrical mask 74 which is rotatable by a stepper motor 92 via a drive shaft 94 to control the selection of wavelengths incident on the exit slits in the local plane by slots in the cylindrical mask as will be explained.

Figure 6:
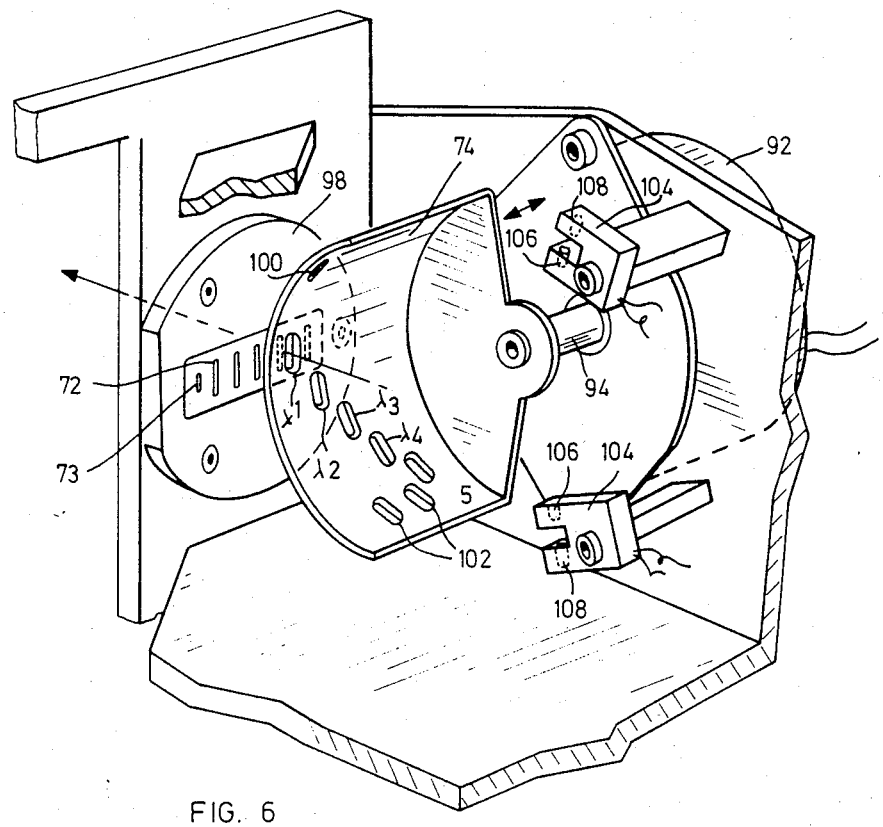
FIG. 6 is an enlarged perspective and partly broken away view of the cylindrical shield and mask shown in FIG. 5.

Referring now to FIG. 6, the photomultiplier tube 42 has a circular mask 98 located in front in the focal plane which has five wavelengths slots 72 and a calibrator slot 73 arranged in a generally horizontal line. The curved mask 74 is mounted on a shaft 94 coupled to the stepper motor 92 driven under control of the circuitry 44 so that the cylindrical mask rotates about the shaft axis which is perpendicular to the direction of the light path. The curved mask is half-cylindrical and has a calibration slot 100, five wavelength slots ($\lambda_1-\lambda_5$) and two auxiliary slots 102, for non-linearity connection as will be later explained. The wavelength exit slits 72 and the calibration slit are in a line parallel to the axis of shaft 94 and are thus alternatively exposed to the light spectrum at a particular point of rotation of the cylindrical mask 74, i.e. when they are aligned with a respective aperture. In this way different wavelength intensities are recorded at different times.

The cylindrical mask has a range of operation between two stops 104 located in the circumferential path. These stops are U-shaped and contain a light source 106 and photodetector 108 and when the light beam to the detector is interrupted by the mask this indicates that the mask has reached one or the other of its limits. The stepper motor steps the mask from one position to another position, such that one of the slots 1 to 5, the pair of slots 102 or the calibration slot 100 may be aligned with the respective slit or slits on the circulator mask 98. This alignment is maintained for about 0.13 seconds, during which time light is transmitted to the photomultiplier tube 42 for determination of the absorption characteristics thereof. The stepper motor displaces the mask between the stops in an oscillatory fashion, which is repeated throughout the measurement process.

Calibration of the spectrophotometer is achieved using the apertures 73 and 100. When the aperture 100 is aligned with its respective exit slit 73, the incident light which is typically provided by a mercury lamp having an optical spectrum with a local region of intensity at 302.1 nm, is scanned across calibration slit 73 by the diffraction grating 40 controlled by the stepper motor 92. This mercury lamp 53 light spectrum is scanned and its median values recorded. This takes about 5 minutes and there is no possibility of operator error. The control circuitry controls the stepper motor 92 to drive the micrometer 63 to adjust the diffraction grating so that the intensity of the median value is maximized. When this occurs the instrument is calibrated. It will be appreciated that this calibration can be done automatically as the instrument is being used so that there is never any need to constantly stop the instrument and recalibrate it. Wavelength calibration to within $\pm 0.0005$ nm is obtained with this procedure and a wavelength stability of 0.003 nm has been achieved over a temperature range of $-20°$ C. to $+40°$ C.

Figure 7:
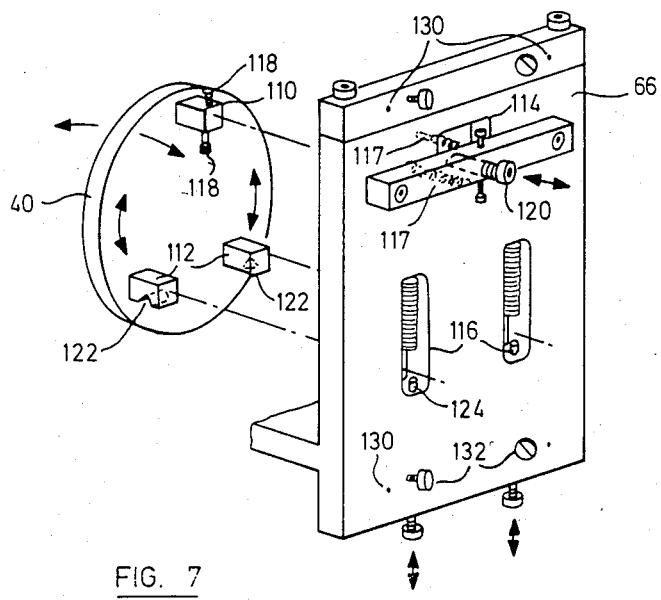
FIG. 7 is an exploded view of the mirror mounting and adjusting structure.
Figure 8:
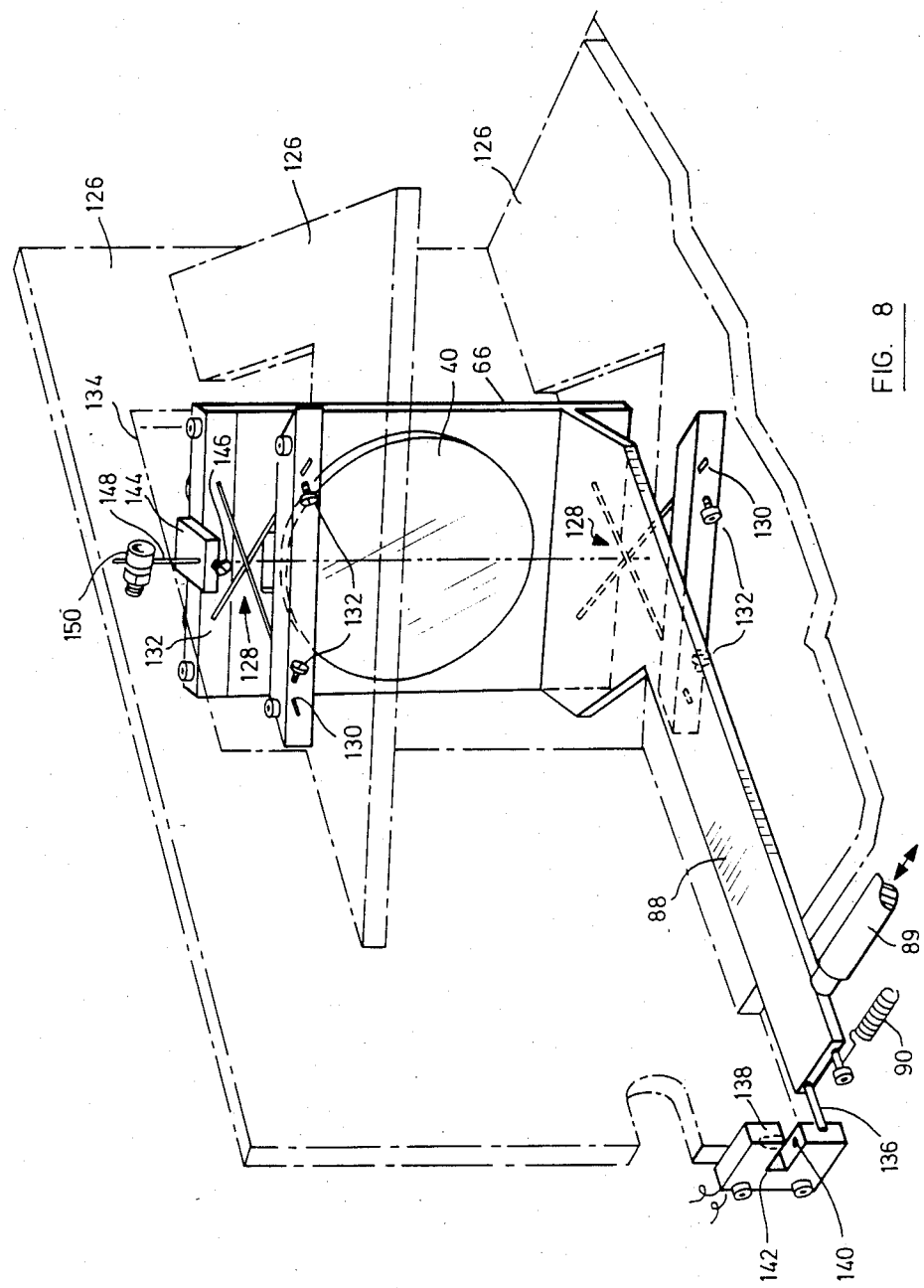
FIG. 8 is a view of the apparatus of FIG. 7 assembled and illustrating the mirror adjusting structure.

FIGS. 7 and 8 will now be referred to to describe the mounting and movement of the circular diffraction grating 40. Referring firstly to FIG. 7 it will be seen that the grating 40 has 3 blocks anchored to its rear face; an upper block 110 and two lower blocks 112. The grating 40 is mounted in carrier frame 66 which has an upper aperture 114 for receiving the top block 110 and two lower slots 116 for receiving the lower blocks 112. The grating is securely mounted on frame 66 by upper and lower springs 117 which fastens to aperture upper and lower pins 118 on block 110. An adjusting screw 120 allows the grating to be tilted about is lower mounting. The lower blocks 112 have recesses 122 for receiving pins 124 located in the bottom of slots 116. These pins in combination with upper adjusting screw 120 permit the grating 40 to be tilted relative to the vertical plane. Also, raising or lowering a respective pin 124 will cause the mirror to be tilted about the horizontal axis i.e. as shown by the arrows just above blocks 112.

As seen in FIG. 8 the grating 40, when mounted in the carrier frame 66, is then secured to a fixed structure 126 using rigid cross-wires 128 at the top and bottom of the carrier frame 66. The cross-wires 128 pass through diagonally opposed apertures 130 in the fixed structure and the carrier frame and are rigidly secured in position by small set screws 132. The carrier frame 66 is integral with the grating tilt arm 88.

In response to a control signal from the control circuitry 44 the stepper motor 92 drives the micrometer to cause push rod 89 to push the tilt arm 88 and hence the frame 66 with the grating 40 to rotate the frame within recess 134 and scan the spectrum of the calibration light source. A rod 136 is located on the end of the arm 88 which interrupts a light beam from a light source 138 to a photocell 140, located in a stop block 142 which causes the stepper motor drive to reverse and the tilt arm 88 hence the frame 66 and grating 40 are returned to their original position by return spring 90. Also the frame 66 carries a projection 144 which receives a vertical locating wire 146 which is secured by set screws 148. The wire 148 is also secured by a screw 150 to fixed frame 126 but twists to accommodate rotation of the frame 66 of 5° or less.

Automatic linearity correction is achieved by using two spaced apertures 102, which are located in planes parallel to slots 2 and 4. These apertures allow the deadtime on the photomultiplier tube to be calculated to compensate for non-linearity. This is done by adding successive separate counts taken at wavelengths $\lambda_2$ and $\lambda_4$ and then adding counts obtained simulataneously at wavelengths $\lambda_2,\lambda_4$, when apertures $\lambda_2$ and $\lambda_4$ are aligned with their respective slits 72. The sum of the separate counts is compared with the combined count taken simultaneously and the difference is used to calculate the dead time. This provides automatic correction of the linearity of the system and provides very reliable and accurate results.

Reference is now made to FIGS. 9 and 10 which illustrate schematically the photomultiplier tube 42 and control circuit 44 and the gating of pulses by the photomultiplier tube. The photomultiplier is an EMI type 6265S and when used in accordance with the manufacturer's published data, i.e. at a voltage of about 1400 V, photon pulses from the photomultiplier have a rise and fall term of about 7 nanoseconds (FIG. 10). This corresponds to an average current of about $10^{-4}$ amps. These pulses are processed by the control circuit 44 shown in detail in FIG. 9. Referring to FIG. 9, the pulses are firstly amplified by an amplifier 150 to give a pulse of about 1 volt into 100 ohm load. The amplified pulse is then applied to a high speed one-shot or monostable multivibrator 152 made from Schottky clamped gates (Texas Instruments SN74S00). This circuit acts as a crude discriminator rejecting noise pulses of smaller amplitude and the output from the discriminator passes through a main gate 154 then through an amplifier 156 to a digital counter 157 of a computer board. The counts registered are stored in separate addresses in a RAM 159, and with each storage the digital counter is reset by the computer to receive counts from the next channel. The counts are transfered along a communication bus to a control computer which controls the processing of the counts by software to correct for dark counts and to satisfy theoretical equations where various functions of intensities can be calculated after correction for nonlinearity has been made and the dark count subtracted.

The control circuitry 44 system synchronises the opening of the slits to the opening of the corresponding counting gate. The mask is cycled across the exit slits and moves betwen the stops at a rate of about one and one-half times per second so that each wave length is sampled about three times a second.

Referring now to FIG. 10, initially the digital counter is set at zero and when a start signal is given the control counter is released and also the main gate 154 is opened, so that dark counts are obtained when light does not pass through any exit slit i.e. when the mask is rotated between the calibration slit and first exit slit. The counter is then reset and photon counts from the first exit slit for wavelength $\lambda_1$, are passed through to the digital counter. When the counts, are stored in RAM 159, the computer resets the counter which then counts photons from the second wavelength $\lambda_2$ signal, when it is opposite the second exit slit. This pattern is repeated so that each signal is counted when the aperture of the cylindrical mask is registered with a respective slit of the opening. Because of the gating, as the mask is stepped from one wavelength position to the next the signal from the photomultiplier is substantially free of mechanical transition effects.

The overall structure disclosed in the preferred embodiment weighs about 55 lbs (25 kg) and has physical dimensions of 68 cm×46 cm×21 cm. It can be powered at 1.0 amp and 110 volts or 0.5 amps and 220 volts.

Various modifications may be made to the embodiment hereinbefore described without departing from the scope of the invention. For example, the particular wavelengths selected may be replaced by other wavelengths, and the position of the exit slits adjusted accordingly. Also, different numbers of wavelengths could be used depending on the selected mathematical procedure for processing the results from the spectrophotometer. More than one calibration source could be used and it will be appreciated that another aperture will be required in the cylindrical mask. Also, for a single calibration source the mercury light source could be replaced by any other suitable light source. For automatically measuring the signal by compensating for deadtime, it will be understood that other pairs of wavelengths could be selected and that more than two wavelengths could be used, depending on the choice of mathematical procedure to process and analyse the results. Also, a number of add-on features could be readily added to give automatic control foreoptics, automatic field of view controls, neutral density filter selection, quartz plate diffuser selection, prism zenith angle positioning, conversion (analog to digital) of voltage and temperatures for automatic monitoring and self-testing, complete azimuth and zenith pointing systems, and a dock and UVB monitoring port.

The $NiSO_4$ filter could be replaced by a much less temperature dependent filter or the filter could be removed if a high quality ghost-free grating were used. Also, the instrument can be programmed to cycle at different rates for example if measurements are to be made of two wavelengths only.

The present instrument has several advantages over the prior instruments for haze and cloud corrections. Firstly, because the space in between wavelengths in the grating instrument is about 3 nanometers, any slow variation of particular scattering coefficents with wavelength will result in smaller differences between the closely spaced grating wavelengths, and secondly, haze problems are reduced with the present instrument because full wavelengths are measured almost simultaneously so that changes in the sky conditions will not have serious effects on double ratio.

We claim:

1. A spectrophotometer comprising:
   a housing having mirror means for reflecting an incident light input,
   diffraction grating means for receiving the reflected light input and for diffracting the reflected light to give a light spectrum,
   a plurality of exit slit means located in the focal plane of the spectrophotometer so as to provide a focused light sprectrum, each exit slit means corresponding to a location of a particular wavelength of the focussed light spectrum,
   photomultiplier tube means operable in a first mode to receive the focussed light spectrum from said exit slit means and to convert said focussed light into electrical signals,
   control means for controlling the orientation of the diffraction grating means in the housing,
   calibration means having a light source for providing a calibration spectrum, said photomultiplier tube means being operable in a second mode to receive said calibration spectrum by way of an additional slit located in the focal plane of the spectrophotometer, said control means orienting said diffraction grating means during said second mode for scanning said calibration spectrum and determining the median wavelength position of said calibration spectrum,
   said control means constituting means effective during said second mode to provide a control signal in response to the median wavelength position for adjusting the position of the diffraction grating means to provide said particular wavelengths at each of said respective slits,
   inhibit means to inhibit operation of said calibration means during said first mode.

2. A spectrophotometer as claimed in claim 1, wherein said control means comprises a computer, a stepper motor and a micrometer, said micrometer being drivable by the stepper motor in response to signals from the computer to control the orientation of the diffraction grating in the housing.

3. A spectrophotometer as claimed in claim 1, wherein said calibration means comprises a mercury light source, and means for gating said calibration spectrum to said photomultiplier tube means.

4. A spectrophotometer as claimed in claim 1, wherein six exit slits are located on the focal plane, five exit slits corresponding to preselected wavelengths position in the spectrum of the UV region of the spectrum, and the remaining slit corresponding to the selected calibration wavelength position.

5. A spectrophotometer as claimed in claim 1, including lens means for viewing incident light and for directing said incident light into the housing, said control means including a computer for processing electrical output signals from said photomultiplier tube means.

6. A spectrophotometer as claimed in claim 1, wherein said calibration means includes wavelength cycling means, said wavelength cycling means having a mask with a plurality of apertures corresponding to respective exit slits, said mask being movable under the control of said control means to bring a respective aperture into register with a respective exit slit to allow light at that particular wavelength to pass to the photomultiplier tube means.

7. A spectrophotometer having means for automatically linearising the output signal of a photomultiplier tube comprising:
   a housing having mirror means for collimating incident light input, diffraction grating means for diffracting the collimated light to give a light spectrum,
   a plurality of exit slit means located in the focal plane of the spectrophotometer, each exit slit means corresponding to a particular wavelength of the light spectrum, said photomultiplier tube receiving focussed light from said exit slit means and converting said focussed light into electrical signals, wavelength cycling means located in the housing, said wavelength cycling means having a mask for covering said exit slits with a plurality of apertures therein, corresponding to respective exit slits, said mask being movable to bring a respective aperture into register with a respective exit slit to allow light at that particular wavelength of pass to the photomultiplier tube, said mask having at least two additional apertures for permitting light from two particular wavelengths to pass to said photomultiplier tube at the same time, and control and computing means for calculating the sum of the light intensity from two wavelengths at different times, and comparing said sum with the value of light intensity obtained in response to light from two particular wavelengths being passed to said photomultiplier tube at the same time, said control means constituting means effective to use said comparison to automatically linearise said photomultiplier tube output.

8. A spectrophotometer as claimed in claim 7, wherein said mask has a cylindrical surface and is rotatable about a longitudinal cylindrical axis, said apertures being located in planes perpendicular to said axis and spaced around the periphery to the mask, means for rotating the mask about said cylindrical axis to bring a particular aperture into register with a particular exit slit, so that only light at respective wavelengths can pass to said photomultiplier tube.

9. A spectrophotometer as claimed in claim 7 wherein, six exit slits are located on the focal plane, five exit slits corresponding to preselected wavelengths position in the spectrum of the UV region of the spectrum, and the remaining slit corresponding to the selected calibration wavelength position.

10. A spectrophotometer as claimed in claim 7 including lens means for viewing incident light and for directing said incident light into the housing, said control means including a computer for processing electrical output signals from said photomultiplier tube.

11. A method of determining the ozone and sulphur dioxide gas concentration in the atmosphere, comprising a first mode, said first mode including the steps of:

observing the atmosphere and receiving incident light therefrom, diffracting said incident light to produce a diffracted signal having a frequency spectrum with wavelengths a function of the said gases in the atmosphere, passing said wavelengths through selected slits in a spectrophotometer focal plane to provide light of particular wavelengths, detecting the intensity of said particular wavelengths using a photomultiplier tube and generating corresponding electrical signals therefrom, said method having a second mode exclusive to said first mode and including the steps of:

providing an additional slit and a calibration light source for causing light to pass through said additional slit, scanning said light which passes through said calibration slit and producing a signal representative of the median wavelength intensity of said calibration light, controlling the location of said diffraction grating using said median wavelength signal to adjust said grating to maximise the intensity of said median wavelength signal to provide wavelengths of a predetermined value at said respective slits.

12. A method of automatically linearising a spectrophotometer output signal comprising the steps of:

recording the light intensity of a first wavelength at a first time, recording the light intensity at a second wavelength at a second time, adding the light intensities recorded at said first and second wavelengths to give a first summed intensity value, recording the light intensities from both first and second wavelengths at the same time to give a second summed intensity value, comparing the sum of said first and second summed values, processing the difference between said first and second summed values to provide an indication of deadtime, and using said indication of deadtime to compensate for non-linearity in the spectrophotometer output signal.

13. Apparatus for controlling the wavelength to be read from a spectrophotometer by a photomultiplier tube comprising:

a generally cylindrical mask having a plurality of apertures therein, said apertures being spaced around the periphery of said mask in parallel planes, perpendicular to the cylindrical axis, means for stepping said mask about said cylindrical axis from a first position to a second position so as to bring a predetermined aperture in the mask into register with a respective slit in said focal plane to permit light of a particular wavelength to pass from said spectrophotometer to said photomultiplier tube, said predetermined aperture being selected from a set including said plurality of apertures.

14. Apparatus as claimed in claim 13, wherein said mask includes an aperture for registering with a calibration slit and at least two apertures arranged parallel with said cylindrical axis for registering with at least two exit slits simultaneously, said apertures comprising means for permitting the photomultiplier tube output signal to be automatically corrected for linearity.

* * * * *